United States Patent [19]

Derrien et al.

[11] Patent Number: 4,892,270
[45] Date of Patent: Jan. 9, 1990

[54] ROCKING BEAM LANDING GEAR

[75] Inventors: Michel Derrien, Versailles; Jacques Veaux, Chatillon; Jean-Pierre Hainaut, La Queue en Brie, all of France

[73] Assignee: Messier-Haspano-Bugatti, Montrouge, France

[21] Appl. No.: 203,994

[22] Filed: Jun. 8, 1988

[30] Foreign Application Priority Data

Jun. 9, 1987 [FR] France ................... 87 07996

[51] Int. Cl.⁴ ............................................. B64C 25/36
[52] U.S. Cl. ............................ 244/104 R; 244/103 R
[58] Field of Search ......... 244/103 R, 102 R, 102 SL, 244/104 R

[56] References Cited

U.S. PATENT DOCUMENTS 3,195,840  7/1965  Tollar .................................. 244/102
4,359,199 11/1982  Kramer ........................... 244/100 R

OTHER PUBLICATIONS

H. G. Conway: "Landing gear design", 1958, Chapman & Hall Ltd., London, GB 'p. 231, Figure 270'.

Primary Examiner—Joseph F. Peters, Jr.
Assistant Examiner—Rodney Corl
Attorney, Agent, or Firm—Sixbey, Friedman, Leedom & Ferguson

[57] ABSTRACT

Landing gear comprising a pivoting strut (1) receiving the rod of a shock absorber (2) which projects downwardly from the strut and is movable in an axial direction (3) relative thereto, a rocking beam (4) mounted to tilt at the bottom end of the shock absorber rod (2) and supporting leading and trailing wheel sets (6), a torque linkage comprising a top branch (7) and a bottom branch (8) which are hinged to each other, the top branch (7) being hinged to the strut (1) and the bottom branch (8) being hinged to the rocking beam, and locking means (9, 15) for limiting a downwards pivot movement of the top branch (7) of the torque linkage while the shock absorber rod (2) is not fully extended.

7 Claims, 4 Drawing Sheets

ROCKING BEAM LANDING GEAR

BACKGROUND OF THE INVENTION

In order to be able to take off with a considerable noseup angle, long-fuselage aircraft require very long (i.e. tall) main landing gear in order to prevent the tail from touching the ground. Further, in order to ensure that the trim of an aircraft running on the ground is substantially horizontal without requiring long nose landing gear which is excessively long, it is desirable for the main landing gear to be of the rocking bogie type. In order to oppose tilting of the rocking beam which is hinged to the bottom end of the shock absorber rod and which forms the rocking bogie, it is necessary to provide a reaction link or a limited-opening torque linkage having one end fixed to the strut of the shock absorber and having its opposite end fixed to the rocking beam which is hinged to the bottom end of the shock absorber rod. The nearer the reaction link is fixed to the end of the rocking beam furthest from the wheel which touches the ground first, the greater the force opposing tilting. However, when the reaction link or torque linkage is fixed to a point close to the end of the rocking beam, the length of the stroke of the shock absorber rod is increased as is the retraction stroke in cases where it is necessary to retract the shock absorber while raising the undercarriage, and this gives rise to drawbacks, and in particular to an increase in the weight of the landing gear and to an increase in sliding friction on the shock absorber rod.

An object of the present invention is to provide a rocking bogie landing gear which makes it possible to obtain a greater force opposing the tilting of the rocking beam without simultaneously increasing the stroke of the shock absorber rod or the retraction stroke, and making it possible to reduce sliding friction.

SUMMARY OF THE INVENTION

In order to achieve this object, the present invention provides a landing gear comprising a pivoting strut receiving the rod of a shock absorber which projects downwardly from the strut and is movable in an axial direction relative thereto, a rocking beam mounted to tilt at the bottom end of the shock absorber rod and supporting leading and trailing wheel sets, a torque linkage comprising a top branch and a bottom branch which are hinged to each other, the top branch being hinged to the strut and the bottom branch being hinged to the rocking beam, and locking means for limiting a downwards pivot movement of the top branch of the torque linkage while the shock absorber rod is not fully extended.

thus, throughout the stage when the rocking beam is tilting, only the bottom branch of the torque linkage pivots so that the force transmitted by the torque linkage to the strut is directed along the longitudinal direction of the bottom branch of said torque link.

In a first advantageous embodiment of the invention, the locking means comprise an abutment associated with the top branch of the torque linkage and facing one side of the strut. Thus, while the rocking beam is pivoting, the abutment bears against one side of the strut and the top branch of the torque linkage is held in its bottom limit position throughout the entire stage during which the rocking beam is tilting.

In a second advantageous embodiment of the invention, the locking means comprise a telescopic link having one end connected to the top branch of the torque linkage and having its opposite end connected to the strut. Thus, while the rocking beam is tilting, the telescopic link is taken to an extreme position in which it maintains the top branch of the torque linkage in a bottom limit position.

According to another advantageous aspect of the invention, the landing gear includes return means for returning the top branch of the torque linkage towards a bottom limit position. Thus, the rocking beam takes up a well-defined orientation even when none of its wheels is in contact with the ground.

According to yet another advantageous aspect of the invention, for a bottom limit position of the top branch of the torque linkage, the bottom branch of the torque linkage is directed towards the point of intersection between the axial direction of the shock absorber rod and the line of application of the force applied to the trailing wheel set of the landing gear at the moment when it contacts the ground during landing. Thus, the resultant of the force applied to the trailing wheel set and of the force applied to the bottom branch of the torque linkage passes along the axis of the shock absorber rod, thereby tending to reduce sliding friction and thus increase landing comfort.

BRIEF DESCRIPTION OF THE DRAWINGS

Two embodiments of the invention are described by way of example with reference to the accompanying drawings, in which:

FIG. 3 is a diagrammatic side view of the landing gear of FIG. 1 in the partially landed state; and FIG. 4 is a diagrammatic side view of the landing gear of FIG. 1 in the fully landed state.

DESCRIPTION OF PREFERRED EMBODIMENTS

Figure 1:
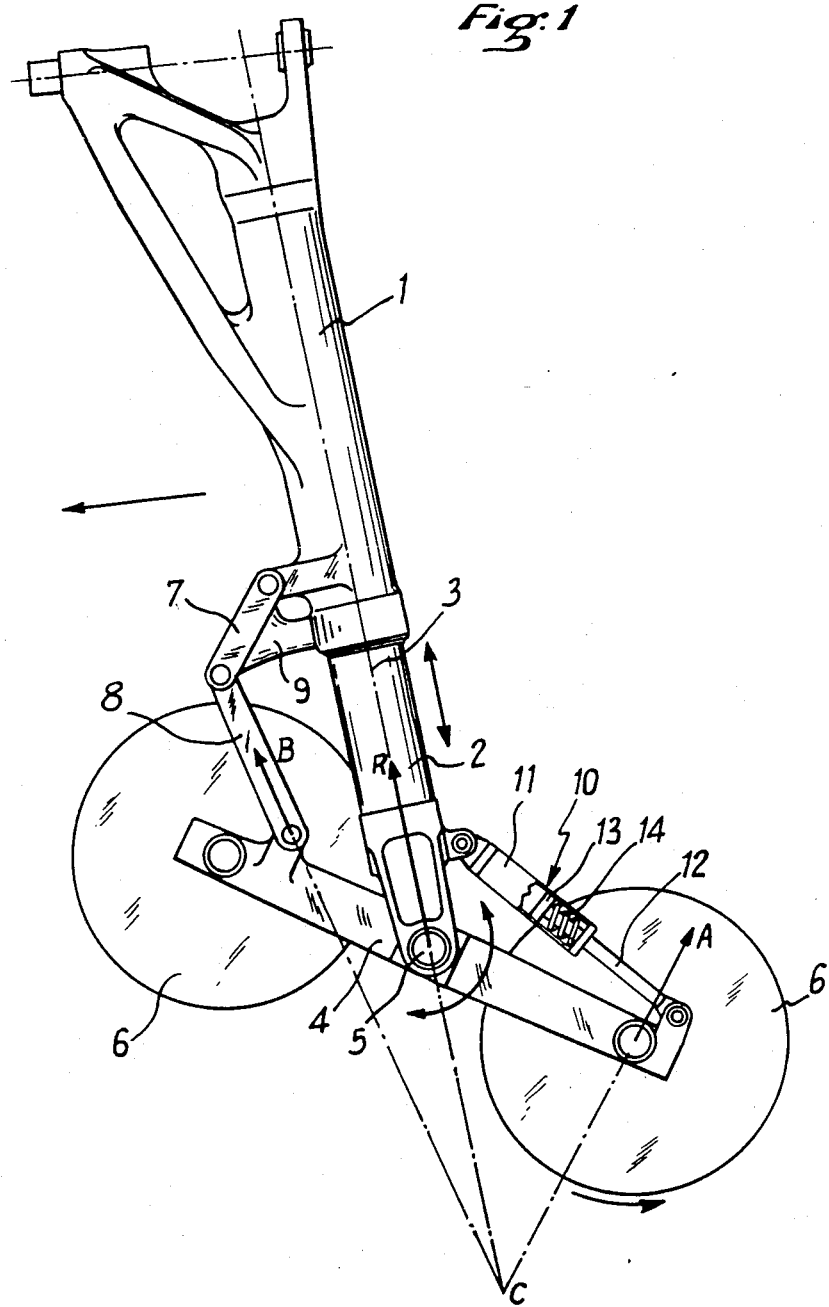
FIG. 1 is a diagrammatic side view of a first embodiment of landing gear in accordance with the invention.

With reference to the drawings, landing gear in accordance with the invention conventionally comprises a strut 1 fitted at its top end with means for pivotally connecting it to the structure of an aircraft. Naturally, the strut 1 is also connected to the structure of the aircraft by control means (not shown) for lowering or raising the landing gear. A shock absorber rod 2 movable along an axial direction 3 is associated with a shock absorber (preferably a retractable shock absorber) disposed inside the strut 1, with the rod 2 projecting downwardly from the strut 1. A rocking beam 4 is mounted to tilt about an axis 5 at the bottom end of the shock absorber rod 2 and it carries a wheel set 6 at each of its ends. A torque linkage is disposed between the strut 1 and the rocking beam 4 on the leading side of the strut 1 in the direction of aircraft displacement, and it comprises a top branch 7 and a bottom branch 8 which are hinged to each other, with the top branch 7 being hinged to the strut 1 and with the bottom branch 8 being hinged to the rocking beam 4.

In accordance with the invention, the landing gear includes locking means for limiting downwards pivoting motion of the top branch 7 of the torque linkage. In the first embodiment shown in FIG. 1, the locking means comprise an abutment 9 associated with the top branch 7 of the torque linkage and extending so as to face one side of the strut 1.

Preferably, the landing gear also includes a telescopic link given a general reference 10 and comprising a cylinder 11 connected to the trailing side of the shock absorber rod 2 (trailing relative to the direction of aircraft displacement), and a rod 12 extending inside the cylinder 11 and having one end hinged to the rocking beam 4 in the vicinity of its trailing end. The end of the link rod 12 which extends inside the cylinder 11 includes a head 13 against which a compression spring 14 bears in such a manner as to exert a traction force on the rod 12.

The landing gear in accordance with the invention operates as follows: when the landing gear is in the fully extended position as shown in FIG. 1, i.e. immediately after take-off or immediately before landing, the rocking beam 4 is urged anti-clockwise by the return means constituted by the spring-loaded telescopic link 10. This causes the abutment 9 to bear against the leading side of the strut 1 and the top branch 7 of the torque linkage to be locked in a bottom limit position. The beam 4 is tilted with the trailing wheel set being at a lower level than the leading wheel set. On landing, when the trailing wheel set touches the ground, as shown in FIG. 3, a force A is applied to the axis of rotation of the trailing wheel set by reaction from the ground. This force A causes the rocking beam to pivot about its axis 5 while maintaining the abutment 9 pressed firmly against the side of the strut 1 such that only the bottom branch 8 of the torque linkage is free to pivot. As a consequence, the force which balances the moment of the force A about the tilt axis 5 of the rocking beam is a force B directed along the longitudinal axis of the bottom branch 8 of the torque linkage. The geometry of the torque linkage, i.e. the lengths of its top and bottom branches 7 and 8 and the point at which the bottom branch 8 is fixed to the rocking beam is designed in such a manner as to cause the bottom branch 8 of the torque linkage to be directed towards the point of intersection C between the line of action of the force A and the axis 3 of the shock absorber rod. Thus, the resultant R of the forces A and B is directed along the axial direction 3 of the shock absorber 2 which is therefore not subjected to shear forces and slides freely into the strut 1.

When the leading wheel set also touches the ground, the landing gear ceases to operate in lever mode and switches to operating in direct mode with the shock absorber rod 2 being thrust into the shock absorber. In this mode of operation, the torque linkage tends to close and the abutment 9 ceases to be pressed against the side of the strut 1, as shown in FIG. 4.

During take-off, the torque linkage is initially in its closed position and it opens progressively as the shock absorber rod 2 is extended. The abutment 9 engages the side of the strut before the shock absorber rod 2 is fully extended, and subsequent extension of the shock absorber rod 2 causes the rocking beam 4 to tilt, such that the landing gear then operates in lever mode.

It may be observed that the spring link 10 may be replaced by a hydraulic and/or pneumatic shock absorber. In which case the link 10 also acts as a shock absorber against pitching.

Figure 2:
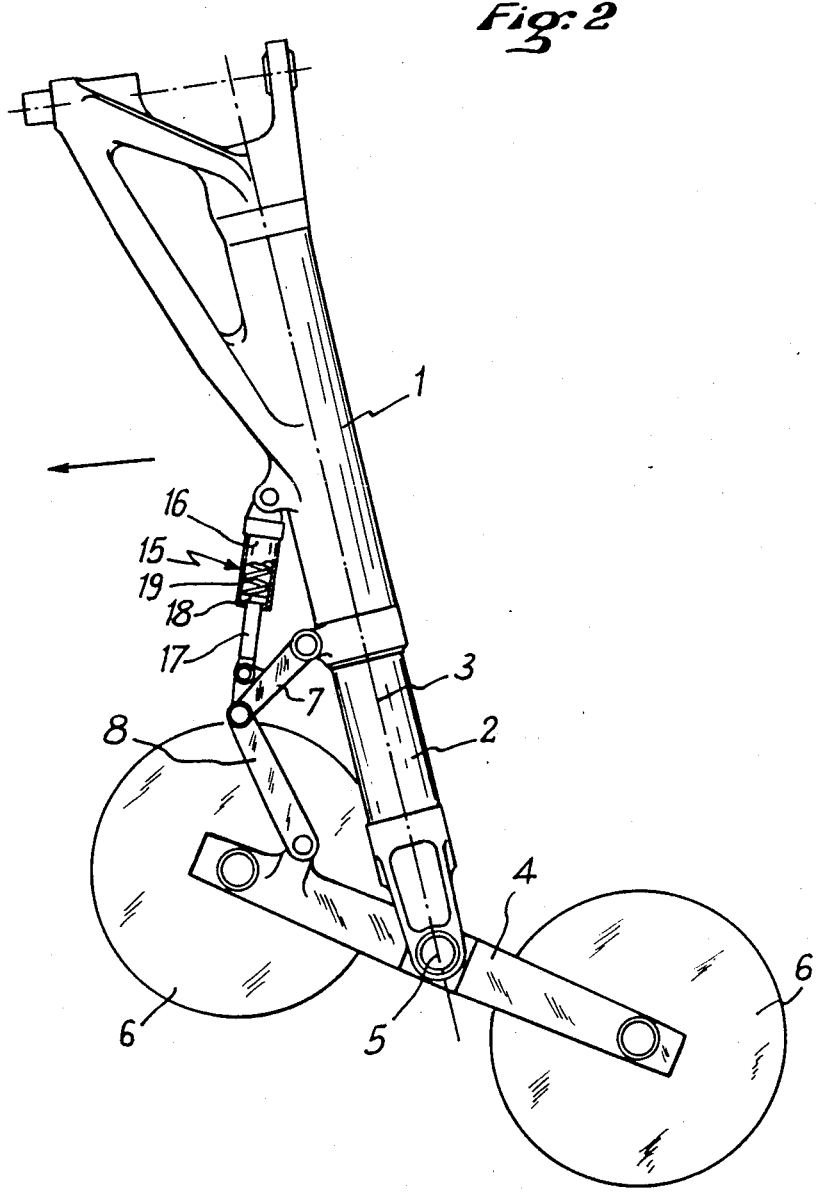
FIG. 2 is a diagrammatic side view of a second embodiment of landing gear in accordance with the invention.

In the second embodiment shown in FIG. 2, the abutment 9 and the spring link 10 have been replaced by a spring link given an overall reference 15 and comprising a cylinder 16 hinged to the leading side of the strut 1 at a point situated above the point where the top branch 7 of the torque linkage is hinged to the strut 1, and further comprising a rod 17 having its bottom end hinged to the top branch 7 of the torque linkage. The top end of the link rod 17 terminates in the form of a head against which a compression spring 19 is engaged tending to urge the head 18 downwardly until it comes into abutment against the bottom end of the cylinder 16.

Like FIG. 1, the FIG. 2 landing gear is shown in the fully extended position. In this position, the spring 19 thrusts the rod 17 to a fully extended position and the top branch 7 of the torque linkage is thus in a bottom limit position. When the trailing wheel set touches the ground, the forces acting on the landing gear tend to maintain the rod 17 in its fully extended position and the top branch 7 of the torque linkage is thus kept locked in its bottom limit position while the rocking beam pivots anti-clockwise until the leading wheel set touches the ground and causes the shock absorber rod 2 to be retracted in direct operating mode.

Here again, the spring link 15 as shown in the figure could be replaced by a shock absorber which, in direct operating mode, would act as a shock absorber against pitching.

Naturally, the invention is not limited to the embodiment described, and variants can be applied thereto without going beyond the scope of the invention. In particular, in the FIG. 1 embodiment, the rigid abutment 9 could be replaced by a telescopic link of the same type as the link 10, with the cylinder hinged to the side of the strut 1 beneath the point where the top branch 7 is hinged to the strut 1, and with the rod connected to the top branch 7. With such a structure, the telescopic link remains retracted while the rocking beam is pivoting, and begins to extend when the shock absorber rod 2 is retracting.

Without going beyond the scope of the invention, the forces generated at the torque linkage, for example the torque applied to the landing gear while the aircraft is swivelling on the ground, may be transmitted via different paths by suitably selecting the nature of the hinges used on the branches of the torque linkage, either between each other or between the branches the items with which they are associated. For example, if the middle hinge is in the form of a knuckle joint or an equivalent mechanism, i.e. a joint allowing the two branches of the torque linkage to move relative to each other in a plane perpendicular to the plane containing them, and if the bottom hinge of the torque linkage is a hinge which is firmly constrained to pivot about one axis only, then the torque resulting from swivelling is transmitted with a magnitude resulting from the distance between the middle hinge axis and the longitudinal axis of the beam. The beam can then be subjected to considerable twisting about its longitudinal axis without applying much force to the top branch of the torque linkage. In contrast, if the middle hinge is constrained to allow the two branches of the torque linkage to pivot relative to each other only in the plane which contains them (the plane of the figures in the examples shown), while the bottom hinge is a knuckle joint or the like, then the torque resulting from swivelling is essentially transmitted to the top branch of the torque linkage and is applied to the rocking beam solely in proportion to the distance between the bottom hinge of the torque linkage and the longitudinal axis of the rocking beam.

We claim:

1. Landing gear comprising a pivoting strut receiving the rod of a shock absorber which projects downwardly from the strut and is movable in an axial direction relative thereto, a rocking beam mounted to tilt at the bottom end of the shock absorber rod and supporting leading and trailing wheel sets, a torque linkage comprising a top branch and a bottom branch which are hinged to each other, the top branch being hinged to the strut and the bottom branch being hinged to the rocking beam, and locking means for limiting a downwards pivot movement of the top branch of the torque linkage while the shock absorber rod is in both a fully extended and nonfully extended position.

2. Landing gear according to claim 1, wherein the locking means comprise an abutment associated with the top branch of the torque linkage and facing one side of the strut.

3. Landing gear according to claim 1, wherein the locking means comprise a telescopic link having one end connected to the top branch of the torque linkage and having its opposite end connected to the strut.

4. Landing gear according to claim 1, including return means for returning the top branch of the torque linkage towards a bottom limit position.

5. Landing gear according to claim 1, wherein for a bottom limit position of the top branch of the torque linkage, the bottom branch of the torque linkage is directed towards the point of intersection between the axial direction of the shock absorber rod and the line of application of the force applied to the trailing wheel set of the landing gear at the moment when it contacts the ground during landing.

6. Landing gear comprising a pivoting strut receiving the rod of a shock absorber which projects downwardly from the strut and is movable in an axial direction relative thereto, a rocking beam mounted to tilt at the bottom end of the shock absorber rod and supporting leading and trailing wheel sets, a torque linkage comprising a top branch and a bottom branch which are hinged to each other, the top branch being hinged to the strut and the bottom branch being hinged to the rocking beam, and locking means including a telescopic link having one end connected to the top branch of the torque linkage and having its opposite end connected to the strut for limiting a downwards pivot movement of the top branch of the torque linkage while the shock absorber rod is not fully extended.

7. Landing gear comprising a pivoting strut receiving the rod of a shock absorber which projects downwardly from the strut and is movable in an axial direction relative thereto, a rocking beam mounted to tilt at the bottom end of the shock absorber rod and supporting leading and trailing wheel sets, a torque linkage comprising a top branch and a bottom branch which are hinged to each other, the top branch being hinged to the strut and the bottom branch being hinged to the rocking beam, locking means for limiting a downwards pivot movement of the top branch of the torque linkage while the shock absorber rod is not fully extended, and a return means for returning the top branch of the torque linkage towards a bottom limit position.

* * * * *